(12) United States Patent
Fräger et al.

(10) Patent No.: US 7,045,925 B2
(45) Date of Patent: May 16, 2006

(54) STATOR FOR AN ELECTRICAL INDUCTION MACHINE, ESPECIALLY A SYNCHRONOUS MACHINE

(75) Inventors: Carsten Fräger, Hameln (DE); Sven Hilfert, Hameln (DE); Matthias Müller, Barntrup (DE); Edmund Neumann, Wennigson (DE)

(73) Assignee: Lenze Drive Systems GmbH, Aerzen (DE)

(*) Notice: Subject to any disclaimer, the term of this patent is extended or adjusted under 35 U.S.C. 154(b) by 0 days.

(21) Appl. No.: 10/475,287

(22) PCT Filed: Apr. 19, 2002

(86) PCT No.: PCT/EP02/04318

§ 371 (c)(1),
(2), (4) Date: Oct. 17, 2003

(87) PCT Pub. No.: WO02/087056

PCT Pub. Date: Oct. 31, 2002

(65) Prior Publication Data

US 2004/0119368 A1 Jun. 24, 2004

(30) Foreign Application Priority Data

Apr. 20, 2001 (DE) ................. 101 19 642

(51) Int. Cl.
*H02K 1/14* (2006.01)

(52) U.S. Cl. ....................... 310/218; 310/216

(58) Field of Classification Search ........ 310/216–218, 310/179, 208, 254
See application file for complete search history.

(56) References Cited

U.S. PATENT DOCUMENTS 4,712,035 A * 12/1987 Forbes et al. ............... 310/269

(Continued)

FOREIGN PATENT DOCUMENTS

| DE | 9846489 | 4/2000 | ................ 1/8 |
| EP | 0849857 | 6/1998 | ................ 1/14 |

(Continued)

*Primary Examiner*—Tran Nguyen
(74) *Attorney, Agent, or Firm*—Bourque & Associates

(57) ABSTRACT

A stator for an electric rotating-field induction generator that is much simpler to produce, especially regarding its windings, includes main and auxiliary poles projecting inward pressed or otherwise disposed radially onto the inner side of a yoke and positioned alternately about the circumference, of which the auxiliary poles are not wound, and the main poles are each surrounded by a coil. Each of the wound poles has a groove in the direction of the longitudinal side parallel to the axis along its longitudinal sides to accept coil sections, and these grooves include a trapezoidal cross-section and are enclosed by the non-wound auxiliary poles at the longitudinal-side groove opening. The auxiliary poles are incorporated with the yoke, and the poles are formed as separately-wound laminations that possess force-fit elements parallel to the axis on its joint sides extending toward the yoke whose force-fit elements parallel to the axis correspond to the distance to the division of the wound poles on the inner side of the yoke. The individual coils are easier to wind, and particularly may be wound directly onto the poles to be wound. The non-wound auxiliary poles isolate the coils on the wound poles from one another, and the winding heads do not come into contact with one another because the coils do not cross in the frontal area on both sides of the stator.

11 Claims, 2 Drawing Sheets

U.S. PATENT DOCUMENTS

| | | | | |
|---|---|---|---|---|
| 4,816,710 A | * | 3/1989 | Silvaggio et al. | 310/194 |
| 5,331,240 A | | 7/1994 | Hyodo | 310/71 |
| 5,866,965 A | * | 2/1999 | Baronosky et al. | 310/208 |
| 5,909,072 A | * | 6/1999 | Muller | 310/68 B |
| 6,107,718 A | * | 8/2000 | Schustek et al. | 310/218 |

FOREIGN PATENT DOCUMENTS

| | | | |
|---|---|---|---|
| EP | 1014536 | 6/2000 | 1/14 |
| EP | 1020975 | 7/2000 | 1/12 |
| EP | 1087497 | 3/2001 | 1/18 |
| GB | 2224399 | 5/1990 | 1/18 |

\* cited by examiner

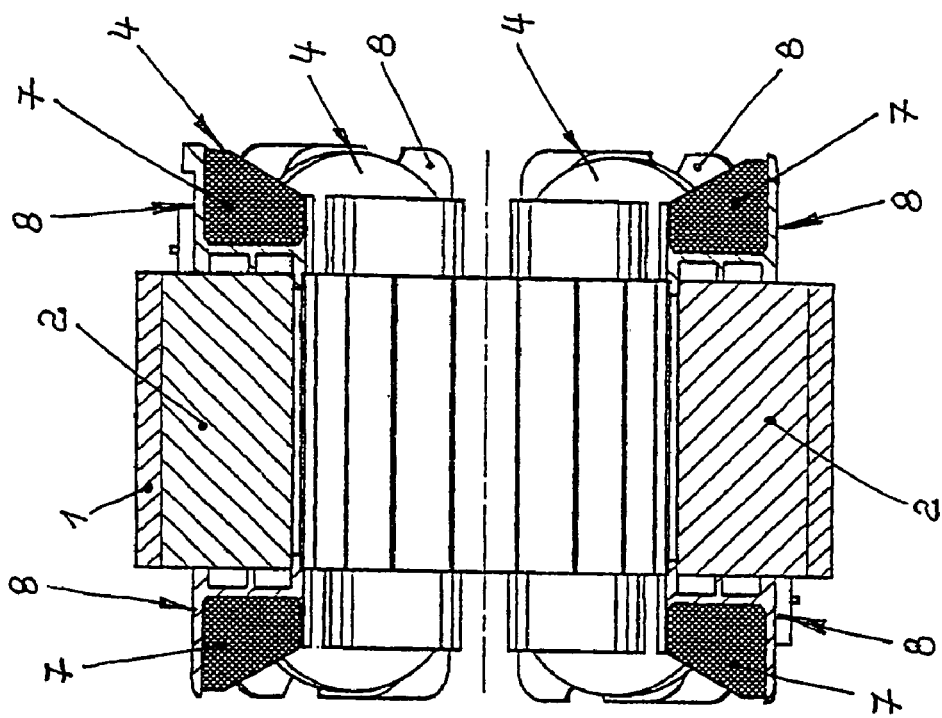
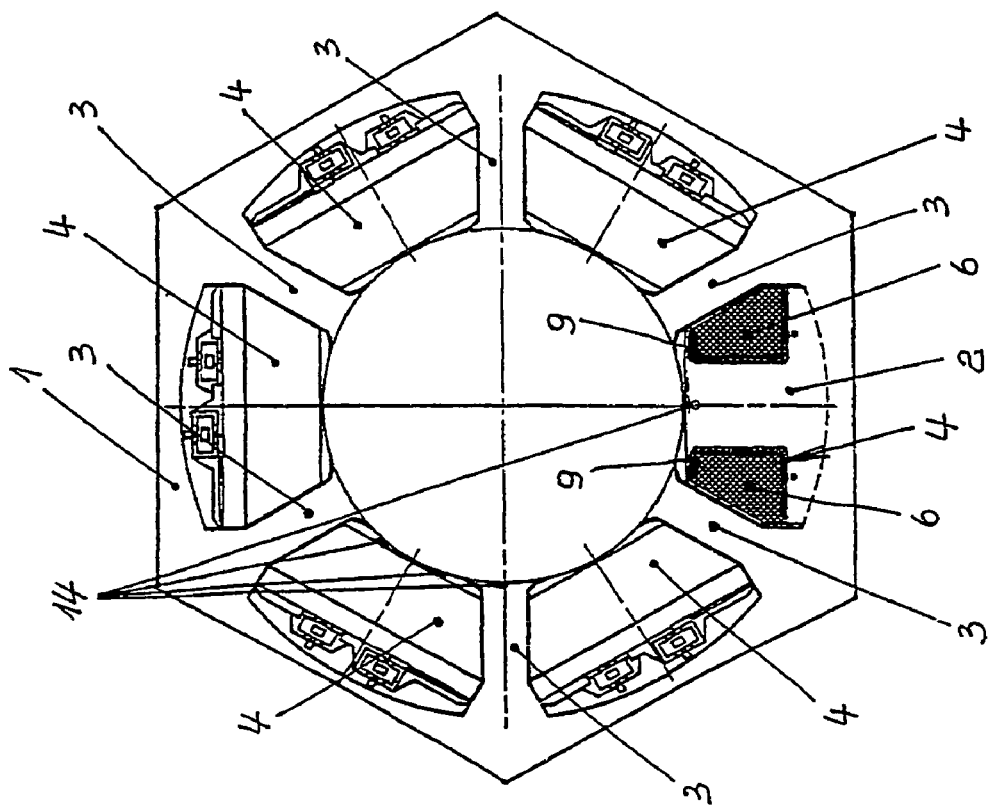

STATOR FOR AN ELECTRICAL INDUCTION MACHINE, ESPECIALLY A SYNCHRONOUS MACHINE

TECHNICAL FIELD

The invention relates to a stator for an electric rotating-field induction generator, particularly for a synchronous induction machine, with at least one laminated armature stampings forming a ring-shaped yoke and a winding on its inner side that consists of several, or a large number, of coils divided about the circumference.

BACKGROUND INFORMATION

It is accepted in rotating-field induction generators, particularly in synchronous induction machines, to position the windings in grooves located along the inner circumferential side of the yoke. Depending on the configuration of the grooves, the individual coils of the overall winding basically cross and contact one another in the frontal area. Equally complicated is the installation of the coils of the winding into the grooves, after which insulation from one another must be provided on the winding heads.

In direct-current (DC) generators, the windings are positioned on pressed poles. A stator for a DC motor that is segmented is known from GB 2 224 399 A. The yoke of this stator is separated into individual sections that may each be connected at each end to a main pole. Interlocking force-fit elements are provided on the yoke sections and on the main poles. Auxiliary poles may be provided between the main poles on the yoke sections by means of a dovetail connection. There is no discussion about the winding of the pole in GB 2 224 399 A.

Another stator for a DC motor that includes projecting main and auxiliary poles on the inner side of the yoke is known from GB 2 179 205 A. The auxiliary poles may be installed onto the yoke subsequently so that main poles that are incorporated into the stator yoke may be wound.

SUMMARY

The invention is faced with the task of producing a stator for an electric rotating-field induction generator that is much simpler to produce, especially regarding its windings.

For this, main and auxiliary poles projecting inward are pressed or otherwise disposed radially onto the inner side of the laminated or otherwise constructed yoke and positioned alternately about the circumference, of which the auxiliary poles are not wound, and the main poles are each surrounded by a coil. Each of the wound poles has a groove in the direction of the longitudinal side parallel to the axis along its longitudinal sides to accept coil sections, and these grooves include a trapezoidal cross-section and are enclosed by the non-wound auxiliary poles at the longitudinal-side groove opening. The auxiliary poles are incorporated with the yoke, and the poles are formed as separately-wound laminations that possess force-fit elements parallel to the axis on its joint sides extending toward the yoke whose force-fit elements parallel to the axis correspond to the distance to the division of the wound poles on the inner side of the yoke.

It is one feature of the invention that the individual coils are easier to wind, and particularly may be wound directly onto the poles to be wound. The non-wound auxiliary poles limit the coils on the wound poles from one another, and moreover, the winding heads do not come into contact with one another because the coils do not cross in the frontal area on both sides of the stator. Insulation between each of the coils is completely unnecessary, and the individual coils themselves may thus be more simply insulated.

BRIEF DESCRIPTION OF THE DRAWINGS

These and other features and advantages of the present invention will be better understood by reading the following detailed description, taken together with the drawings wherein:

FIG. 1 is a frontal view of a stator for a synchronous generator with a partial cutaway in the area of one of the wound poles;

FIG. 2 is a longitudinal cross-section through the stator as in FIG. 1;

DETAILED DESCRIPTION OF THE PREFERRED EMBODIMENTS

Figure 3:
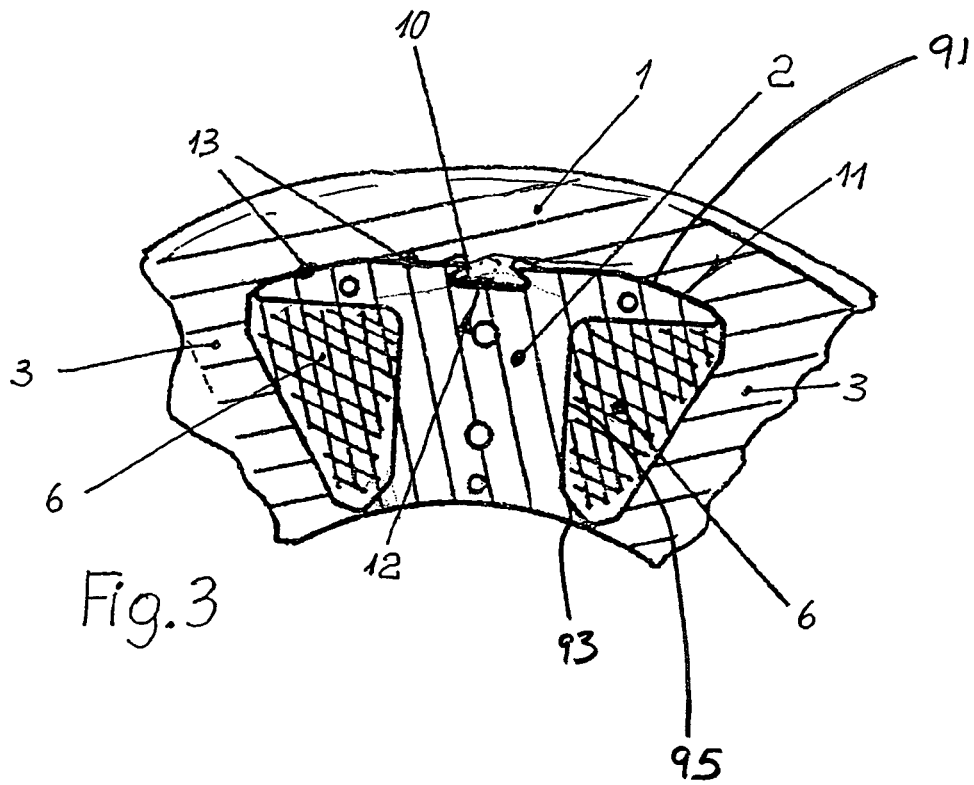
FIG. 3 is an enlarged view of a partial cutaway through the stator as in FIG. 1 in the area of one of the wound poles.

In FIGS. 1 and 2, one may recognize in detail the laminated armature stampings of a stator for a synchronous generator with which a ring-shaped yoke 1 is formed, on whose inner side main poles 2 and auxiliary poles 3 projecting inward are positioned radially. In contrast to other rotating-field induction generators that have a laminated iron core in the stator, the illustrated stator has a main pole 2 and an auxiliary pole 3 as pressed poles.

Each of the main poles 2 bears a coil 4 that is so electrically interconnected with it that a rotating magnetic field results upon current flow that follows the rotor (not shown).

Figure 4:
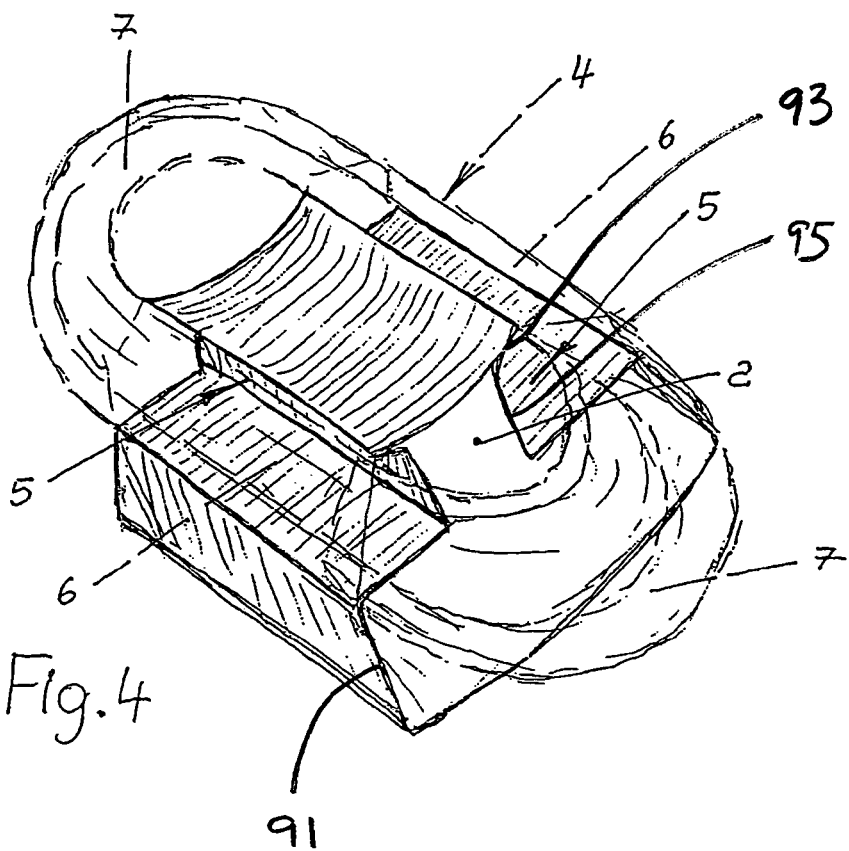
FIG. 4 is a perspective view of a pole for a stator of the type under discussion capable of being wound, with schematically indicated winding.

The main poles 2 preferably feature a generally "I" cross-sectional shape as best shown in FIGS. 3 and 4. The main poles preferably include a generally rectangular coil core 95 having a first and a second base disposed proximate a first and a second, generally opposite end region of the coil core 95. The first and second bases preferably include a first 91 and a second 93 flange, respectively, extending generally outwardly and away from the coil core 95. The first flange 91 includes an engagement device as will be explained in greater detail hereinbelow and preferably extends outwardly further than the second flange 93. The main poles 2 also possess grooves 5 on their longitudinal sides parallel to the axis to accept the coils 4, as FIG. 4 shows. These grooves 5 lying parallel to the axis are enclosed by the auxiliary poles 3 on each side of the main pole 2 that may be wound, so that a basically trapezoidal winding volume results to each side of each main pole 2 that may be wound, into which each of the two longitudinal coil sections 6 of a coil 4 may fit. The grooves of the main poles 2 or the overall winding volume including the flanks of the auxiliary poles 3 are covered by a coil body 9 that surrounds the coil sections accordingly.

In the frontal area of the generator, i.e., in front of the two frontal sides of the stator, the coils 4 form somewhat semi-circular bent head sections 7, as FIG. 4 shows. For simpler winding of the main pole 2 and formation of the head sections 7 of the coils 4, coil mounts 8 are placed on the frontal side that engage with the frontal openings of the longitudinal grooves 5 of the main pole 2, and thus may be inserted into them.

Further, one may see in FIG. 1 that there are grooves 14 parallel to the axis on the surfaces of the main pole 2 facing the air gap that may be present both on the main poles 2 and on the non-wound auxiliary poles 3 that serve to preserve the symmetry of the winding consisting of the individual coils 4.

Winding of the main poles 2 occurs outside the stator, which greatly simplifies the maneuvering and installation of the coils 4. After being wound, the main poles 2, which are still separate, are inserted along the axis direction into the gap between two auxiliary poles 3, and are inserted into the yoke 1 via the joint faces that match the yoke with the smallest possible air gap. For this, the yoke 1 possesses force-fit elements 11 on its inner side parallel to the axis in the form of a bridge with dovetail cross-section in the separation, whose force-fit members 12 match the negative dovetail in the joint faces 11 of the main poles 2. Additionally, longitudinal contours 13 parallel to the axis may be provided on the joint faces in order to ensure exact positioning of the wound main poles 2. The main poles 2 represent a separately-produced lamination for the winding process that may also be inserted into the yoke 1 by means of force-fit elements that are shaped differently.

Positioning of the wound main poles 2 on the yoke 1 is performed in such a manner that, when viewed from the circumferential direction of the yoke 1, the main poles 2 and the auxiliary poles 3 alternate with one another, i.e., an auxiliary pole 3 between two main poles 2, and vice versa, each main pole 2 is positioned between two auxiliary poles 3.

Modifications and substitutions by one of ordinary skill in the art are considered to be within the scope of the present invention, which is not to be limited except by the following claims.

The invention claimed is:

1. A removable pole comprising:
a coil core, said coil core sized and shaped to accept a wound coil having a first and a second longitudinally extending coil section and head sections that are separately provided therearound;
a first base disposed proximate a first end region of said coil core, said first base including a first flanged region extending generally outwardly and away from said coil core, said first base including an engagement device adapted to securely attach said removable pole to a yoke; and
a second base disposed proximate a second end region of said coil core, said second end region generally opposite said first end region, said second base including a second flanged region extending generally outwardly and away from said coil core, wherein said first flange, said second flange, and said coil core define a first and a second retaining area that secures said longitudinal coil sections of said wound coil relative to said removable pole and wherein said first flanged region extends outwardly further than said second flanged region.

2. The removable pole as claimed in 1 claim wherein said engagement device includes a first half of a dovetail connection, wherein said first half of said dovetail connection is sized and shaped to secure said removable pole to said yoke.

3. The removable pole as claimed in claim 1 wherein said coil core includes a generally rectangular shape.

4. The removable pole as claimed in claim 1 wherein said removable pole includes a generally "I" shaped cross-section.

5. A stator comprising:
a generally ring-shaped yoke including an outer side and an inner having a plurality of first engagement regions;
at least two, unwound auxiliary poles projecting generally radially inward from said inner side of said yoke; and
at least two main poles projecting generally radially inward from said inner side of said yoke and disposed such each of said at least two main poles is positioned between two auxiliary poles and each of said at least two auxiliary poles is disposed between two main poles, wherein each of said at least two main poles includes:
a coil core sized and shaped to accept a wound coil having a first and a second longitudinally extending coil sections and head sections that are separately provided therearound;
a first flanged region disposed proximate a first end region of said coil core and extending generally outwardly and away from said coil core, said first flanged region including a second engagement device disposed proximate a outer end region of said first flange region, said second engagement device adapted to secure said main pole to said first engagement device of said yoke; and
a second flanged region disposed proximate a second end region of said coil core, said second end region being generally opposite said first end region, wherein said second flanged region extends generally outwardly and away from said coil core and wherein said first flanged region extends outwardly further than said second flanged region;
wherein said first flange, said second flange, and said coil core define a first and a second retaining area that secures said longitudinal coil sections of said wound coil relative to said removable pole.

6. The stator as claimed in claim 5 wherein said first and said second engagement device includes a dovetail connection.

7. The stator as claimed in claim 5 wherein said coil core includes a generally rectangular shape.

8. The stator as claimed in claim 5 wherein said main pole includes a generally "I" shaped cross-section.

9. A removable pole for use with a coil having a first and a second longitudinally extending coil section and a first and a second head section separately provided therearound, said removable pole comprising a body including a generally "I" shaped cross-section having a first and a second flanged region disposed proximate a first and a second generally opposite end of an intermediary portion, said first flanged region including an engagement device adapted to secure said removable pole to a yoke, wherein said first and said second flanged regions define a first and a second retaining groove, disposed along a first and a second longitudinal face of said intermediary portion, which are sized and shaped to retain said first and said second longitudinally extending coil section relative to said removable pole, wherein said first flanged region extends outwardly further than said second flanged region.

10. The removable pole as claimed in claim 9 wherein said engagement device includes a first half of a dovetail connection, wherein said first half of said dovetail connection is sized and shaped to secure said removable pole to said yoke.

11. The removable pole as claimed in claim 9 wherein said coil core includes a generally rectangular shape.

* * * * *